July 2, 1929.   G. A. LOUD   1,719,514
INTERNAL COMBUSTION ENGINE
Filed Dec. 1, 1927   4 Sheets-Sheet 2

Inventor:
George A. Loud,
by Walter E. Lombard,
Atty.

July 2, 1929.  G. A. LOUD  1,719,514
INTERNAL COMBUSTION ENGINE
Filed Dec. 1, 1927    4 Sheets-Sheet 3

Inventor:
George A. Loud,
by Walter S. Lombard,
Atty.

July 2, 1929.  G. A. LOUD  1,719,514
INTERNAL COMBUSTION ENGINE
Filed Dec. 1, 1927  4 Sheets-Sheet 4
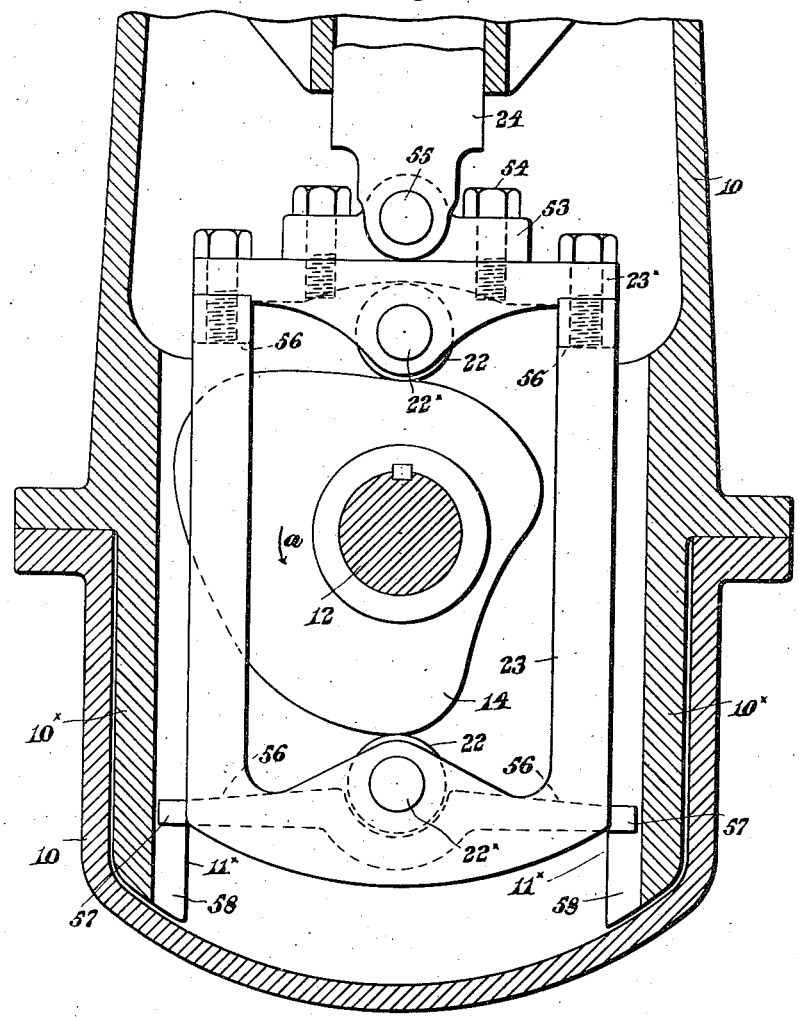
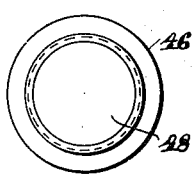
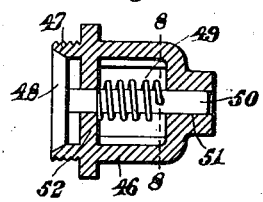
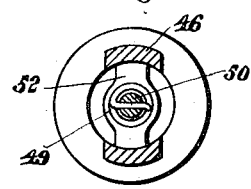
Inventor:
George A. Loud,
by Walter E. Lombard.
Atty.

Patented July 2, 1929.

1,719,514

UNITED STATES PATENT OFFICE.

GEORGE A. LOUD, OF FITCHBURG, MASSACHUSETTS, ASSIGNOR TO LOUD SLIDE VALVE ENGINE CO., OF FITCHBURG, MASSACHUSETTS, A CORPORATION OF MASSACHUSETTS.

INTERNAL-COMBUSTION ENGINE.

Application filed December 1, 1927. Serial No. 236,961.

This invention relates to internal combustion engines and particularly to that class known as two cycle engines, the object of the invention being to simplify the construction, increase the efficiency and reduce the amount of gas mixture necessary for the proper operation of the engine.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 6 represents an end elevation of a valve for controlling the admisison of the combustible mixture.

Figure 7 represents a longitudinal section of the same.

Figure 8 represents a transverse section of the same, and

Figure 9 represents an enlarged elevation of the cam mechanism for actuating the main valve.

Similar characters indicate like parts throughout the several figures of the drawings.

Figure 1:
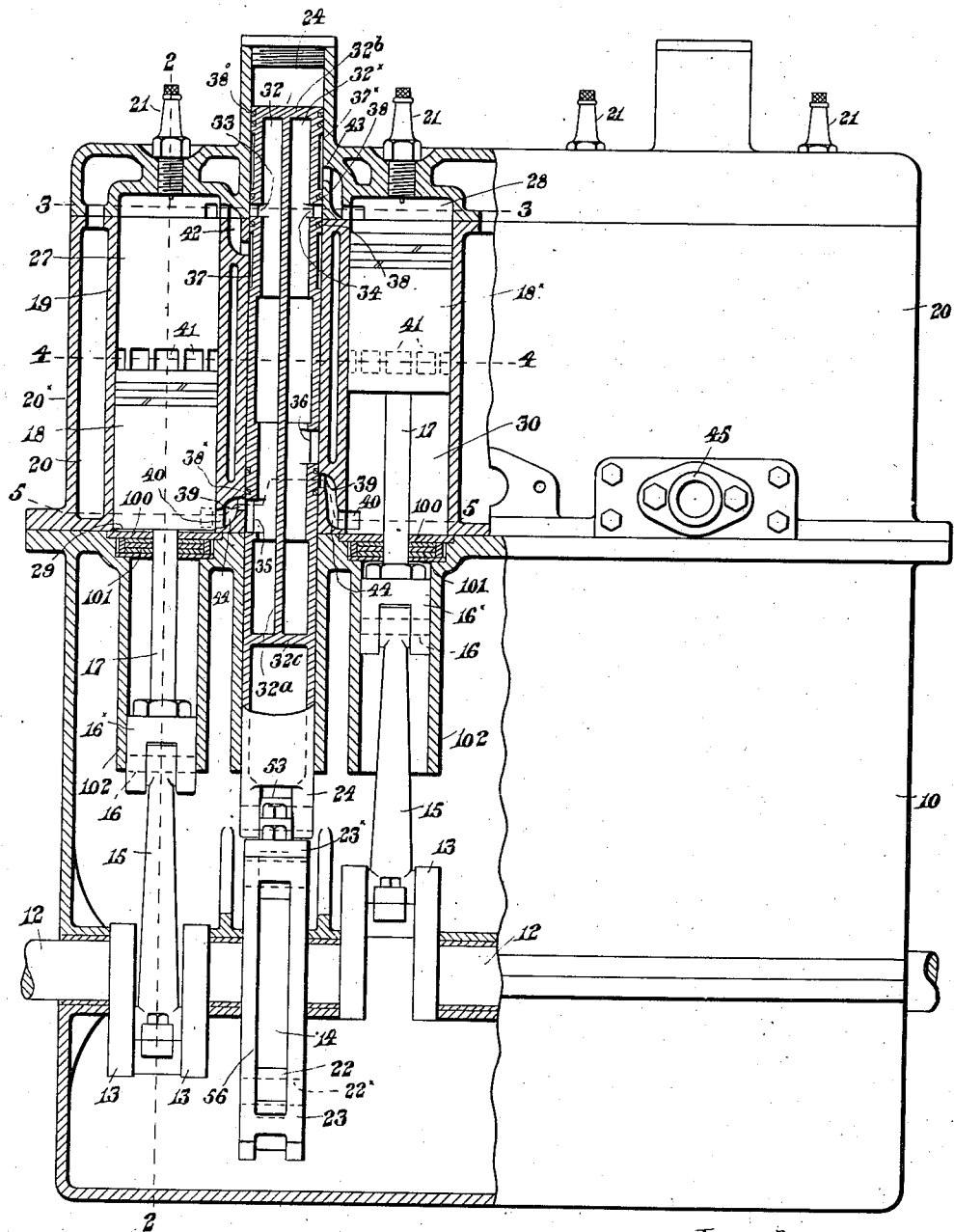
Figure 1 represents a front elevation of an engine embodying the principles of the present invention, a portion of the same being broken in section.

In the drawings, 10 is a crank casing which is of special construction provided with bearings 11 in which is positioned the revoluble power or main crank shaft 12.

The upper part of casing 10 has formed integral therewith inwardly projecting ribs $10^x$ provided with parallel guide faces $11^x$ extending vertically from the bottom of said casing.

The crank shaft 12 is provided with a plurality of cranks 13 and cams 14. The cranks 13 have journaled thereon connecting rods 15 the opposite ends of each of which has a pin 16 extending therethrough, said pin being mounted in the bifurcated member $16^x$ adjustably secured to the lower end of a piston rod 17 projecting downwardly from one of the pistons 18, $18^x$.

Each crank 13 in its rotation reciprocates one of the pistons 18, $18^x$ in its cylinder 19 or $19^x$. Each cylinder 19, $19^x$, is surrounded by a water jacket 20 within an outer casing $20^x$ and adapted to contain a cooling fluid to prevent the overheating of the cylinders during the operation of the engine.

The cylinders 19, $19^x$ are superimposed upon the crank casing 10 and secured thereto. The upper end of the casing 10 is closed by plates 100 and each piston rod 17 extends through a packing 101 below one of the plates 100.

In the upper end of each cylinder 19, $19^x$, is mounted the usual spark plug 21 adapted to ignite the gas charge to operate the pistons 18, $18^x$.

Each cam 14 coacts with rollers 22 revoluble upon pins $22^x$ mounted in a yoke 23 secured to the lower end of a valve 24 adapted to reciprocate in a cylindrical valve chamber 25 disposed midway between each pair of cylinders 19, $19^x$.

The upper ends of the pistons 18, $18^x$, are provided with the usual packing rings 26 which prevent the explosion of the gas charge in the explosion chambers 27 and 28 above the pistons 18, $18^x$, from igniting the gas in the mixing chambers 29 and 30 below said pistons 18, $18^x$.

The upper wall or plate 100 of the crank casing 10 closes the lower end of the cylinders 19, $19^x$, and the packing 101 prevents the gas mixture from leaking into the crank casing 10 from the mixing chambers 29 and 30.

The valve 24 is provided with passages 32, $32^x$ extending lengthwise thereof and having oppositely disposed ports 33, 34 near the upper end thereof and other ports 35, 36, near the lower end thereof. These ports 35, 36 are offset from each other as shown in Fig. 1.

Below the ports 33, 34, said valve is provided with a peripheral annular depression 37 and near the upper end of said valve and above said ports 33, 34, is a similar peripheral annular depression 37×.

Between said depressions 37 and 37× and the ports 33, 34, the valve 24 is provided with a plurality of packing rings 38 and similar packing rings 38× surround said valve between the ports 35, 36 while another packing ring 38° surrounds the upper end of said valve.

Each cylinder 19, 19× has a plurality of ports 39 at its extreme lower end communicating with the valve chamber 25, the inlet ends of these ports being offset from each other as indicated in Fig. 1.

From the lower ends of the mixing chambers 29, 30 extend ports 40 through which combustible mixture is admitted to said mixing chambers during the upward strokes of the pistons 18, 18×.

Immediately above the mixing chambers 29 and 30 each cylinder 19 or 19× is provided with a plurality of exhaust ports 41.

The explosion chamber 27 has extending therefrom a plurality of ports 42 inclined downwardly and communicating at the opposite ends with the valve chamber 25, while the explosion chamber 28 is provided with similar ports 43 inclined upwardly and communicating at the opposite ends with said valve chamber 25 all as indicated in Fig. 1 of the drawings.

Each mixing chamber 29, 30 has its ports 40 communicating with an inlet passage 44 communicating with an enclosed space or chamber 44× formed in the wall of the engine casing and to which a suitable combustible mixture may be admitted.

When an explosive mixture is admitted through the inlet passage 44 and through the ports 40 to the mixing chambers 29 and 30, the combustible mixture in each mixing chamber will be compressed on the next downward stroke of the piston 18 or 18× reciprocating in said mixing chamber.

On the downward stroke of the valve 24, the ports 35 in the valve 24 will register with the ports 39 in the mixing chamber 29, and the compressed combustible mixture will enter one passage 32 in the interior of the valve 24 and as said valve moves upwardly said mixture will pass upwardly and then be discharged therefrom through the ports 33 in said valve and ports 42 of the cylinder 19 into the explosion chamber 27.

The interior of the valve 24 is divided into two vertical compartments or passages, 32 and 32×, by means of the partition 32ª, the ends of said compartments or passages being closed by the walls 32ᵇ and 32ᶜ at the top and bottom thereof.

It is obvious that when the ports 35 and 39 are in register the ports 33 and 42 will be out of register as shown in Fig. 1 of the drawings.

The compresesd combustible mixture in the compression chamber 30 will in like manner be forced through the ports 39 and ports 36 into the compartment or passage 32× within the valve 24 and upon the upward stroke of the valve 24 pass upwardly and then be discharged through the ports 34 and 43 into the explosion chamber 28.

When the combustible mixture is exploded in either chamber 27 or 28, it will force the piston 18 or 18× downwardly uncovering the exhaust ports 41 when said piston 18 or 18× reaches its lowest position.

The burnt gases will then escape through the ports 41 into the chamber 45 and through the discharge opening therefrom.

The annular depression 37 is of sufficient length to be in communication with the ports 42 when the ports 33 and 34 of the valve 24 are in a position midway of the ports 42, 43.

When the explosion takes place in either of the explosion chambers 27 or 28, the annular peripheral depressions 37, 37×, will be opposite the ports 42, 43 respectively, and any gases exploding in said ports or said depressions 37, 37×, will be neutralized against the end walls of said depressions and therefore have no effect upon said valves.

By providing the depressions 37, 37×, the valve 24 is perfectly balanced and no injurious effect can be produced upon said valve or the valve chamber 25 by the explosion of the combustible mixture.

The throw of the cam 14 is less than half the length of the crank 13 and consequently the valve 24 will move less than half the distance that the pistons 18, 18×, move in their reciprocation.

It is self-evident that the combustible mixture will be admitted to the combustion chamber 27 when the valve 24 is moving in one direction and the combustible mixture will be admitted to the combustion chamber 28 when said valve is moving in the opposite direction.

Figure 2:
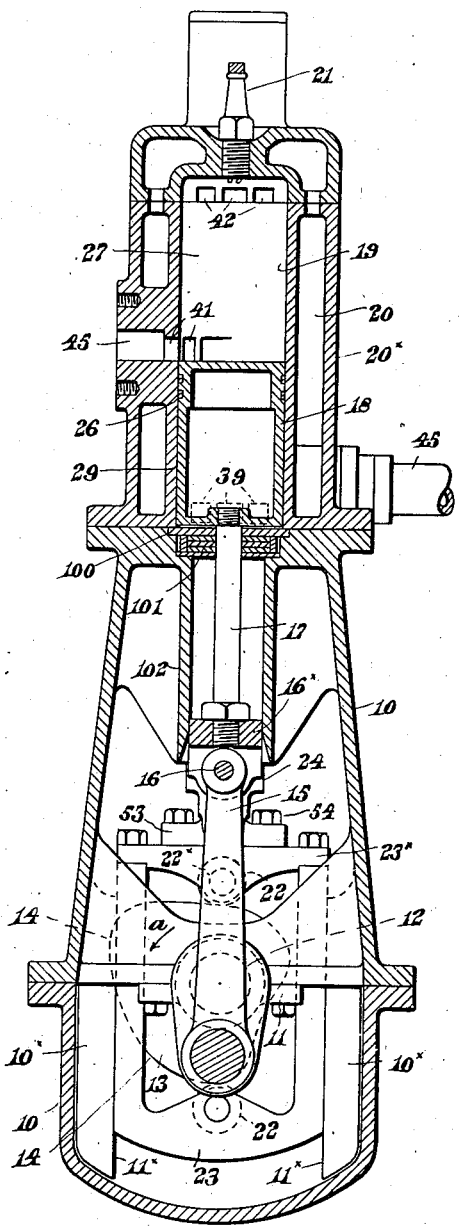
Figure 2 represents a transverse vertical section of the same on line 2, 2, on Fig. 1.
Figure 3:
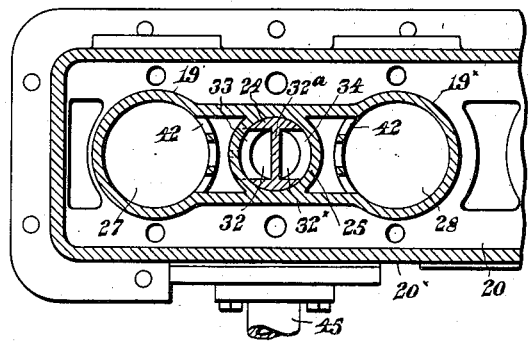
Figure 3 represents a horizontal section on line 3, 3, on Fig. 1.
Figure 4:
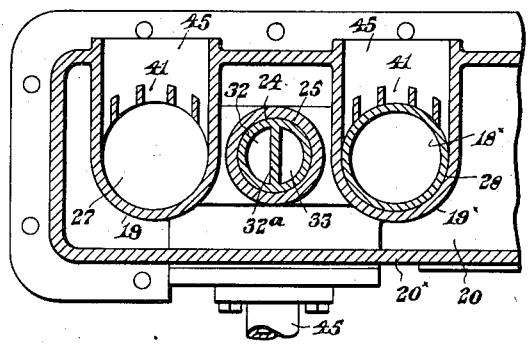
Figure 4 represents a horizontal section on line 4, 4, on Fig. 1.
Figure 5:
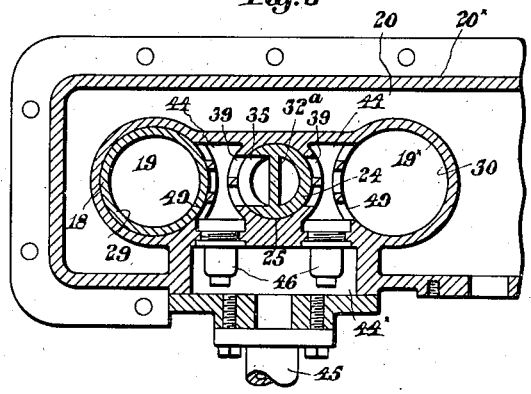
Figure 5 represents a horizontal section on line 5, 5, on Fig. 1.

The main crank shaft 12 revolves in the direction of the arrow a on Fig. 2 when the car on which the engine is mounted is moving forward. When it is desired to back the car this can be accomplished by simply revolving the shaft 12 in the opposite direction. This can be done by stopping the engine and then cranking said engine in the reverse direction or effecting the same reverse movement by means of a self-starter.

The general operation of the engine is substantially the same as that of the engine illustrated and described in another application of mine, now Patent No. 1,666,710, April 17, 1928, and therefore it is deemed unnecessary to describe the operation in detail since reference may be readily made to the pending application referred to.

In said earlier application the combustible mixture was admitted to the top of the mixing chamber below a piston when said piston was in its highest position but it has been found to advantage to admit said combustible mixture to the lower end of the mixing chamber and have its admission controlled by the suction created by the upward movement of the piston.

This is accomplished in the following manner:

The ports 40 from the lower end of each mixing chamber communicate by means of the passage 44 with the chamber or enclosed space 44× which space 44× is common to each pair of cylinders 19, 19× embodied in the engine.

Combustible mixture is admitted continuously to this enclosed space 44× through a supply pipe 45.

Screwed into the inlet end of each passage 44 is a housing 46, Fig. 7, having at its inner end a valve seat 47 on which a valve 48 is normally held by means of a spring 49 surrounding the valve stem 50 adapted to move endwise in the bearing 51 and spider 52.

The opposite sides of the housing 46 are cut away so that when the valve 48 is moved from its seat 47 the gas mixture may pass freely through the spider 52, passage 44 and ports 40 into a mixing chamber 29 or 30.

When either piston 18, 18× is moving upwardly the suction thus created in the mixing chamber beneath the piston will be sufficient to overcome the tension of spring 49 and open the valve 48 thereby admitting the combustible mixture to that particular mixing chamber.

When one valve is opened by the upward movement of one piston the other valve is retained on its seat by the pressure caused by the downward movement of the other piston.

The yoke 23 is made in two parts, the body portion being U-shaped with its upper ends connected by a plate 23× to the upper side of which is secured a member 53 by bolts 54.

This member 53 extends through the bifurcated end of the valve 24 and is secured thereto by pin 55.

The plate 23× has a roller 22 mounted thereon and on the yoke 23 is oppositely disposed another roller 22.

These rollers 22 coact with the periphery of the cam 14 at all times during the rotation of said cam about the axis of the shaft 12.

The side walls of the yoke 23 have openings 56 therein through which the cam 14 extends so that under no circumstances can the yoke be displaced laterally relatively to said cam.

From these side walls extend lugs 57 into grooves 58 in the ribs 10× thus insuring a correct reciprocation of the yoke during the reciprocation of the valve 24.

Owing to the disposition of the rollers 22, 22 on opposite sides of the shaft 12, the valve 24 will be positively reciprocated by the cam 14 during the rotation of the shaft 12, said cam being provided with the necessary concentric surfaces to bring the valve 24 to a standstill at predetermined points in its reciprocation.

The lower valve ports 35, 36 are considerably longer than the upper valve ports 33, 34 and are also considerably longer than the ports 39 with which they coact.

Owing to this greater length of the ports 35, 36 these ports will remain in communication with the ports 39 for some time during the reciprocation of the valve thereby permitting all the combustible mixture in the mixing chambers 29, 30 to be wholly ejected into a valve compartment 32, 32× before said ports 39 are closed by the movement of the valve 24.

It is self-evident that the combustible mixture in each cylinder will be compressed in each mixing chamber by the downward movement of a piston and will be further compressed in the explosion chamber by the upward movement of said piston.

In the operation of both pistons 18, 18×, the pistons are so timed in their movements that in their return stroke they close the exhaust ports 41 before the fresh compressed charges of gas can escape through said exhaust ports.

From the above it will appear that the mixing chambers 29, 30 of the cylinders 19, 19× alternately receive an explosive gas mixture which is partly compressed and mixed and then alternately delivered to the explosion chambers, in which the mixture is again compressed and then exploded causing the pistons to reciprocate and drive the main crank shaft.

Each member 16× is cylindrical and is adapted to reciprocate in a cylindrical bearing 102 depending from the upper wall of the crank casing 10.

The upper end of each cylindrical bearing is closed by a plate 100 and packing members 101 surrounding each piston rod 17.

By providing these bearings 102 for the members 16× on the lower ends of the piston rods 17 the correct reciprocation of the pistons 18, 18× is always insured.

It is believed that the operation and many advantages of the invention will be fully understood without further description.

Having thus described my invention, I claim—

1. In an internal combustion engine having two cylinders; reciprocable pistons in said cylinders; a reciprocating valve having two compartments extending lengthwise thereof and separated by a central partition, one compartment during the reciprocation of said valve communicating through ports at opposite ends of said compartment with the mixing and explosion chambers of one cylinder and the other compartment through similar ports with said chambers of the other cylinder; and means for admitting a combustible mixture to the lower end of each mixing chamber through ports adapted to be closed and opened by said pistons during the reciprocation thereof.

2. In an internal combustion engine having two cylinders; reciprocable pistons in said cylinders; a reciprocating valve having two compartments extending lengthwise thereof and separated by a central partition, each compartment having ports at the upper and lower ends thereof, the lower port of each compartment during the reciprocation of said valve communicating with the mixing chamber of a different cylinder and subsequently in said reciprocation closing said port and the upper port communicating with the explosion chamber of the same cylinder; and means for admitting a combustible mixture to each mixing chamber through ports near the lower end thereof, said ports being opened and closed by said pistons during the reciprocation thereof.

3. In an internal combustion engine having two cylinders; reciprocable pistons in said cylinders; a reciprocating valve having two compartments extending lengthwise thereof and separated by a central partition, each compartment having ports at the upper and lower ends thereof, the lower port of each compartment during the reciprocation of said valve communicating with the mixing chamber of a different cylinder and subsequently in said reciprocation closing said port and the upper port communicating with the explosion chamber of the same cylinder; and separate means for admitting a combustible mixture directly to each mixing chamber through ports near the lower end thereof, said ports being opened and closed by said pistons during the reciprocation thereof.

4. In an internal combustion engine having two cylinders; reciprocable pistons in said cylinders; a reciprocating valve having two compartments extending lengthwise thereof and separated by a central partition, each compartment having ports at the upper and lower ends thereof, the lower port of each compartment during the reciprocation of said valve communicating with the mixing chamber of a different cylinder and subsequently in said reciprocation closing said port and the upper port communicating with the explosion chamber of the same cylinder, the lower ports being considerably longer than the upper ports; and means for admitting a combustible mixture to each mixing chamber through ports near the lower end thereof, said ports being opened and closed by said pistons during the reciprocation thereof.

5. In an internal combustion engine having two cylinders and a valve chamber interposed between said cylinder and communicating by ports with the explosion and mixing chambers of said cylinders; a reciprocating valve in said chamber having two compartments extending lengthwise thereof and separated by a central partition, each compartment having ports at the upper and lower ends thereof, the lower port of each compartment being considerably longer than the ports to the mixing chamber with which it is adapted to register during the reciprocation of said valve and the upper port communicating with the ports to the explosion chamber of the same cylinder; and means for admitting combustible mixture to each mixing chamber through ports near its lowest end, said ports being opened and closed by said pistons during the reciprocation thereof.

6. In an internal combustion engine having two cylinders with pistons therein operatively connected to a power shaft; a single valve for both cylinders divided by a central partition into two parallel compartments and adapted to in its reciprocation to permit the passage through said compartments of the combustible mixture from the mixing chambers to the explosion chambers of said cylinders, each compartment coacting with a different cylinder; means on the power shaft for moving said valve; and separate means for admitting a combustible mixture to the lower end of each mixing chamber directly through ports in its cylinder wall, which ports are adapted to be opened and closed by said pistons during the reciprocation thereof.

7. In an internal combustion engine; a pair of cylinders; a valve chamber intermediate said cylinders and having two sets of ports communicating with said cylinders; a piston in each cylinder; a power shaft operable by said pistons; a valve reciprocable in said chamber and having two parallel compartments with ports at the opposite ends thereof adapted to control the flow of combustible mixture through the upper and lower ports of one cylinder in the movement of said valve in one direction and the ports of the other cylinder in the movement of said valve in the opposite direction; means for admitting a combustible mixture to each mixing chamber through ports adapted to be opened and closed by said pistons during the reciprocation thereof; a casing enclosing said power shaft and provided with parallel guides; a member connected to the lower end of said valve and movable in said guides; and means on said shaft coacting with said member for imparting reciprocatory movement to said valve.

8. In an internal combustion engine having two cylinders; a reciprocating piston in each cylinder; a reciprocating valve having two compartments extending lengthwise thereof and separated by a central partition, one compartment during the reciprocation of said valve communicating through ports at opposite ends of said compartment with the mixing and explosion chambers of one cylinder and the other compartment through similar ports with said chambers of the other cylinder; means for admitting a combustible mixture to each mixing chamber through ports adapted to be opened and closed by said pistons during the reciprocation thereof; a casing surrounding said cylinders having an enclosed space therein; means for admitting a combustible mixture to said enclosed space; and a valve closing a passage from said enclosed space to the lower end of each mixing chamber.

9. In an internal combustion engine having two cylinders; a reciprocating piston in each cylinder; a recipocating valve having two compartments extending lengthwise thereof and separated by a central partition, one compartment during the reciprocation of said valve communicating through ports at opposite ends of said compartment with the mixing and explosion chambers of one cylinder and the other compartment through similar ports with said chambers of the other cylinder; means for admitting a combustible mixture to each mixing chamber through ports adapted to be opened and closed by said pistons during the reciprocation thereof; a casing surrounding said cylinders having an enclosed space therein; means for admitting a combustible mixture to said enclosed space; and a valve closing a passage from said enclosed space to the lower end of each mixing chamber, each valve to the mixing chamber of a cylinder being opened by the suction caused by the upward movement of the piston in said cylinder.

10. In an internal combustion engine having two cylinders; a reciprocating piston in each cylinder; a reciprocating valve having two compartments extending lengthwise thereof and separated by a central partition, each compartment having ports at the upper and lower ends thereof, the lower port of each compartment during the reciprocation of said valve communicating with the mixing chamber of a different cylinder and subsequently in said reciprocation closing said port and the upper port communicating with the explosion chamber of the same cylinder; and means for admitting a combustible mixture to the mixing chamber of each cylinder through ports adapted to be opened and closed by said pistons during the reciprocation thereof, said means including a valve adapted to be opened by suction created by the upward movement of the piston in said cylinder.

11. In an internal combustion engine having two cylinders; a reciprocating piston in each cylinder; a reciprocating valve having two compartments extending; lengthwise thereof and separated by a central partition, each compartment having ports at the upper and lower ends thereof, the lower port of each compartment during the reciprocation of said valve communicating with the mixing chamber of a different cylinder and subsequently in said reciprocation closing said port and the upper port communicating with the explosion chamber of the same cylinder; an inlet pipe for combustible mixture for both cylinders communicating with two passages each leading to the mixing chamber of a cylinder through ports adapted to be opened and closed by said pistons during the reciprocation thereof; and valves in said passages alternately opened by the suction created by an upwardly moving piston.

12. In an internal combustion engine having two cylinders; a reciprocating piston in each cylinder; a reciprocating valve having two compartments extending lengthwise thereof and separated by a central partition, each compartment having ports at the upper and lower ends thereof, the lower port of each compartment during the reciprocation of said valve communicating with the mixing chamber of a different cylinder and subsequently in said reciprocation closing said port and the upper port communicating with the explosion chamber of the same cylinder, the lower ports being considerably longer than the upper ports; means for admitting a combustible mixture to each mixing chamber through ports adapted to be opened and closed by said pistons during the reciprocation thereof; and means actuated by the suction created by an upwardly moving piston for admitting a combustible mixture to each mixing chamber near the lower end thereof.

13. In an internal combustion engine having two cylinders; a reciprocating piston in each cylinder; a valve chamber interposed between said cylinder and communicating by ports with the explosion and mixing chambers of said cylinders; a reciprocating valve in said chamber having two compartments extending lengthwise thereof and separated by a central partition, each compartment having ports at the upper and lower ends thereof, the lower port of each compartment being considerably longer than the ports to the mixing chamber with which it is adapted to register during the reciprocation of said valve and the upper port communicating with the ports to the explosion chamber of the same cylinder; and means for admitting combustible mixture to the mixing chamber of one cylinder during the upward movement of its piston and then to the mixing chamber of the other cylinder during the upward movement of the piston in the last mentioned cylinder, said admission being through ports adapted to be opened and closed by said pistons during the reciprocation thereof.

14. In an internal combustion engine having two cylinders with pistons therein operatively connected to a power shaft; a single valve for both cylinders divided by a central partition into two parallel compartments and adapted in its reciprocation to permit the passage through said compartments of the combustible mixture from the mixing chambers to the explosion chambers of said cylinders; each compartment coacting with a different cylinder; means on the power shaft for moving said valve; and means for alternately admitting a combustible mixture to the lower end of said mixing chambers directly through passages in the side walls of said cylinders, which passages are adapted to be opened and closed by said pistons during the reciprocation thereof.

15. In an internal combustion engine; a pair of cylinders; a valve chamber intermediate said cylinders and having two sets of ports communicating with said cylinders; a piston in each cylinder; a power shaft operable by said pistons; a valve reciprocable in said chamber and having two parallel compartments with ports at the opposite ends thereof adapted to control the flow of combustible mixture through the upper and lower ports of one cylinder in the movement of said valve in one direction and the ports of the other cylinder in the movement of said valve in the opposite direction; and means for admitting a combustible mixture to the mixing chambers through ports adapted to be opened and closed by said pistons during the reciprocation thereof and said ports also forming outlets from said mixing chambers to the compartments of said valve.

16. In an internal combustion engine; a pair of cylinders; a valve chamber intermediate said cylinders and having two sets of ports communicating with said cylinders; a piston in each cylinder; a power shaft operable by said pistons; a valve reciprocable in said chamber and having two parallel compartments with ports at opposite ends thereof adapted to control the flow of combustible mixture through the upper and lower ports of one cylinder in the movement of said valve in one direction and the ports of the other cylinder in the movement of said valve in the opposite direction, the lower ports of said cylinders serving as inlets for fresh combustible mixture to the mixing chambers on the upstroke of the pistons and exits to the valve compartments on the downstroke of said pistons.

17. In an internal combustion engine; a pair of cylinders; a valve chamber intermediate said cylinders and having two sets of ports communicating with said cylinders; a piston in each cylinder; a power shaft operable by said pistons; a valve reciprocable in said chamber and having two parallel compartments with ports at opposite ends thereof adapted to control the flow of combustible mixture through the upper and lower ports of one cylinder in the movement of said valve in one direction and the ports of the other cylinder in the movement of said valve in the opposite direction, and an enclosed space between each cylinder and valve chamber having ports communicating with both mixing chambers which ports are adapted to be opened and closed by said pistons during the reciprocation thereof, said space also communicating with said valve chamber through ports adapted to be opened and closed by said valve during its reciprocation.

18. In an internal combustion engine; a pair of cylinders; a valve chamber intermediate said cylinders and having two sets of ports communicating with said cylinders; a piston in each cylinder; a power shaft operable by said pistons; a valve reciprocable in said chamber and having two parallel compartments with ports at opposite ends thereof adapted to control the flow of combustible mixture through the upper and lower ports of one cylinder in the movement of said valve in the opposite direction; an enclosed space between each cylinder and the valve chamber having ports communicating with both mixing chambers which ports are adapted to be opened and closed by said pistons during the reciprocation thereof, said space also communicating with said valve chamber through ports adapted to be opened and closed by said valve during its reciprocation; an inlet for fresh combustible mixture to said enclosed space; and valves in the inner wall of said enclosed space each adapted to be opened by the upstroke of a piston and closed by the downstroke thereof.

19. In an internal combustion engine; a pair of cylinders; a valve chamber intermediate said cylinders and having two sets of ports communicating with said cylinders; a piston in each cylinder; a piston rod for each piston; a cylindrical member at the lower end of said rod; a power shaft; a crank thereon; a link between said crank and cylindrical member; a valve reciprocable in said chamber and having two parallel compartments with ports at opposite ends thereof adapted to control the flow of combustible mixture through the upper and lower ports of one cylinder in the movement of said valve in one direction and the ports of the other cylinder in the movement of said valve in the opposite direction; a crank casing separated from said cylinders by a closed wall, said casing enclosing said power shaft and having a depending cylindrical bearing for said cylindrical member; and means rotatable with said shaft for imparting reciprocatory movement to said valve.

20. In an internal combustion engine; a pair of cylinders; a valve chamber intermediate said cylinders and having two sets of ports communicating with said cylinders; a piston in each cylinder; a piston rod for each piston; a cylindrical member at the lower end of said rod; a power shaft; a crank thereon; a link between said crank and cylindrical member; a valve reciprocable in said chamber and having two parallel compartments with ports at opposite ends thereof adapted to control the flow of combustible mixture through the upper and lower ports of one cylinder in the movement of said valve in one direction and the ports of the other cylinder in the movement of said valve in the opposite direction; a crank casing separated from said cylinders by a closed wall, said casing enclosing said power shaft and having a depending cylindrical bearing for said cylindrical member; a packing in said enclosed wall at the upper end of said cylindrical bearing surrounding the piston rod; and means rotatable with said shaft for imparting reciprocatory movement to said valve.

Signed by me at 746 Old South Bldg., Boston, Mass., this 14th day of November, 1927.

GEORGE A. LOUD.